United States Patent
Kaneko

(10) Patent No.: US 9,933,987 B2
(45) Date of Patent: Apr. 3, 2018

(54) MULTI-DISPLAY SYSTEM

(71) Applicants: NEC DISPLAY SOLUTIONS, LTD., Tokyo (JP); Yasunobu Kaneko, Tokyo (JP)

(72) Inventor: Yasunobu Kaneko, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 14/777,735

(22) PCT Filed: Mar. 26, 2013

(86) PCT No.: PCT/JP2013/058719
§ 371 (c)(1),
(2) Date: Sep. 16, 2015

(87) PCT Pub. No.: WO2014/155508
PCT Pub. Date: Oct. 2, 2014

(65) Prior Publication Data
US 2016/0070522 A1    Mar. 10, 2016

(51) Int. Cl.
*G09G 5/00* (2006.01)
*G06F 3/14* (2006.01)
*G09G 5/12* (2006.01)

(52) U.S. Cl.
CPC ............ *G06F 3/1446* (2013.01); *G09G 5/12* (2013.01); *G09G 2320/0606* (2013.01); *G09G 2320/08* (2013.01); *G09G 2356/00* (2013.01)

(58) Field of Classification Search
CPC .... G06F 3/0484; G06F 3/04883; G06F 3/017; G06F 3/0482
See application file for complete search history.

(56) References Cited

U.S. PATENT DOCUMENTS

| | | | |
|---|---|---|---|
| 2005/0168399 A1* | 8/2005 | Palmquist | G06F 1/1601 345/1.1 |
| 2007/0243919 A1* | 10/2007 | Thelen | A63F 9/24 463/9 |
| 2010/0053164 A1* | 3/2010 | Imai | G06F 3/011 345/427 |
| 2011/0187662 A1* | 8/2011 | Lee | G06F 1/1641 345/173 |

FOREIGN PATENT DOCUMENTS

| | | |
|---|---|---|
| JP | 2002-099268 A | 4/2002 |
| JP | 2009-086048 A | 4/2009 |
| JP | 2012-198446 A | 10/2012 |
| JP | 2013-009057 A | 1/2013 |

OTHER PUBLICATIONS

International Search Report (ISR) (PCT Form PCT/ISA/210), in PCT/JP2013/058719, dated Jun. 25, 2013.

* cited by examiner

*Primary Examiner* — Nan-Ying Yang
(74) *Attorney, Agent, or Firm* — McGinn IP Law Group, PLLC

(57) ABSTRACT

Display apparatuses which constitute a multi-display system each display a partial picture corresponding to a picture position set in the display apparatus. When each display apparatus is instructed to change the picture position and is notified about a picture position to be changed via operation input means, the display apparatus exchanges pieces of picture position information with a display apparatus displaying a partial picture corresponding to the picture position to be changed and swaps the picture positions of the display apparatuses.

11 Claims, 6 Drawing Sheets

Fig.3

(a)
```
TILE MATRIX
   H MONITORS         3
   V MONITORS         3
   POSITION           1
   SWAP POSITION

△▽ : Select -+ : Change
(EXIT) : Return (MENU) : Close
```

(b)
```
TILE MATRIX
   H MONITORS         3
   V MONITORS         3
   POSITION           1
   SWAP POSITION      9

△▽ : Select -+ : Change
(EXIT) : Return (MENU) : Close
```

(c)
```
TILE MATRIX
   H MONITORS         3
   V MONITORS         3
   POSITION           9
   SWAP POSITION      9

△▽ : Select -+ : Change
(EXIT) : Return (MENU) : Close
```

(a)

(b)

(a)

(b)

MULTI-DISPLAY SYSTEM

TECHNICAL FIELD

The present invention relates to a multi-display system including a plurality of display apparatuses.

BACKGROUND ART

A multi-display system, which has a plurality of display apparatuses arrayed in a vertical direction and in a horizontal direction to constitute a large screen, has become popular as a picture display system in recent years. The multi-display system is increasing in the range of application as a public display for displaying adds on the street and displaying in real time various information in public places, such as an exhibition and a sports facility.

Generally, to display one picture using a multi-display system, each display apparatus divides an input picture signal and displays a partial picture corresponding to a position of the apparatus on an enlarged scale.

Note that a multi-display system, in which an identical picture signal is input to a plurality of display apparatuses, and each display apparatus divides the input picture signal to display a partial picture, is also disclosed in, for example, Patent Document 1 (JP2012-198446A).

In the above-described multi-display system, to change the layout (display layout) of partial pictures to be displayed by the display apparatuses, a setting value needs to be changed using an on-screen display (OSD) function or the like for each display apparatus. For example, to swap partial pictures displayed by two display apparatuses, respective picture positions of the partial pictures to be displayed by the two display apparatuses need to be changed. An operation of changing the display layout is cumbersome and requires much effort by the user.

In order to reduce such effort, for example, a technique for automatically changing a display layout according to the number of pictures input, the resolution of a displayed picture, the positions of people around the system, and the like is disclosed in Patent Document 1 described above. In the technique disclosed in Patent Document 1, however, each display apparatus needs to include a high-throughput CPU (Central Processing Unit) or the like and include a sensor, a camera, or the like to acquire position information of a person around the system. This leads to an increase in the overall cost of the multi-display system.

RELATED ART DOCUMENTS

Patent Document

Patent Document 1: JP2012-198446A

SUMMARY

It is an object of the present invention to provide a multi-display system capable of easily changing a display layout without causing an increase in cost and a display layout changing method for the multi-display system.

In order to attain the above-described object, a multi-display system according to an exemplary aspect of the present invention includes a plurality of display apparatuses that divide one picture represented by a picture signal output from a picture output device into a plurality of partial pictures and display the respective partial pictures at different picture positions, the display apparatus comprises
a display section that displays a picture,
an operation input section that accepts an instruction input,
a communication section that sends and receives information between the plurality of display apparatuses, and
a control section which controls operation of the display section and the communication section in response to an input to the operation input section, and
the control section
causes the display section to display the partial picture corresponding to the picture position that is set in the display apparatus, to which the control section belongs, and
exchanges picture position information with the display apparatus displaying the partial picture corresponding to a picture position to be changed via the communication section and swaps the picture positions of the display apparatuses when the control section is instructed to change the picture position and is notified about the picture position to be changed via the operation input section.

A display layout changing method according to an exemplary aspect of the present invention is a display layout changing method in a multi-display system including a plurality of display apparatuses that divide one picture represented by a picture signal output from a picture output device into a plurality of partial pictures and display the respective partial pictures at different picture positions, the method being for changing the partial pictures to be displayed by the display apparatuses, wherein
the display apparatus
displays the partial picture corresponding to the picture position that is set in the display apparatus and
exchanges picture position information with the display apparatus displaying the partial picture corresponding to a picture position to be changed via communication means and swaps the picture positions of the display apparatuses when the display apparatus is instructed to change the picture position and is notified about the picture position to be changed via operation input means.

BRIEF DESCRIPTION OF DRAWINGS

FIGS. 3(a), 3(b) and 3(c) are schematic views showing one example of an operation screen used to change the display layout shown in FIG. 2.

EXEMPLARY EMBODIMENT

The present invention will be described with reference to the drawings.

First Exemplary Embodiment

Figure 1:
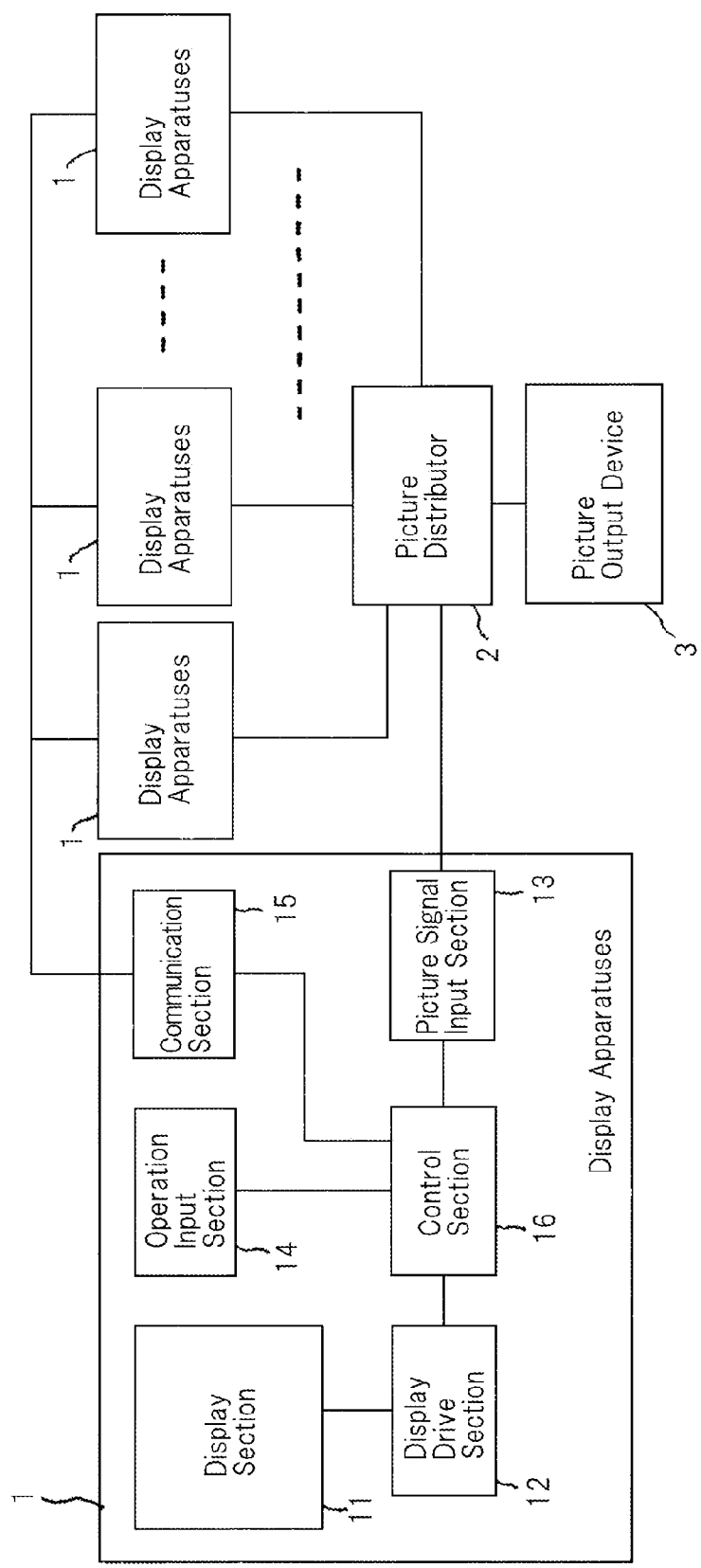
FIG. 1 is a block diagram showing one example of the configuration of a multi-display system according to the present invention.

FIG. 1 is a block diagram showing one example of the configuration of a first exemplary embodiment of a multi-display system according to the present invention.

As shown in FIG. 1, the multi-display system according to the first exemplary embodiment includes plurality of display apparatuses 1 and picture distributor 2 which distributes picture signals to display apparatuses 1. The multi-display system is configured such that picture signals output from picture output device 3 are supplied to display apparatuses 1 via picture distributor 2. Display apparatuses 1 divide one picture represented by picture signals output from picture output device 3 into a plurality of partial pictures and display the respective different partial pictures.

Examples of something called a "picture" in the present specification include a moving image and a still image. Examples of something called a "picture signal" in the present specification include a signal and data for displaying a moving image or a still image.

Picture output device 3 is a computer, a television tuner, or a camera which outputs picture signals for a moving image or a still image to be displayed by the multi-display system, a picture playback apparatus which plays back a picture recorded on various media, or the like. Signals output from picture output device 3 may include not only a picture signal but also a sound signal and any other data signal.

Picture distributor 2 receives a picture signal output from picture output device 3 and distributes the picture signal to display apparatuses 1 of the multi-display system. A known interface, such as DVI (Digital Visual Interface) or HDMI (High-Definition Multimedia Interface), may be used for picture signal transmission. FIG. 1 shows a configurational example in which picture output device 3, picture distributor 2, and display apparatuses 1 are connected in a wired manner. Picture distributor 2 may send or receive a picture signal to or from picture output device 3 or each display apparatus 1 using known wireless means.

Note the multi-display system according to the exemplary embodiment can be implemented even without picture distributor 2 shown in FIG. 1. For example, the multi-display system may be configured such that a picture signal is directly distributed from one picture output device 3 to plurality of display apparatuses 1 connected in series or in parallel, though the number of display apparatuses 1 connected is limited. Alternatively, if the multi-display system includes plurality of picture output devices 3 corresponding one-to-one to the display apparatuses, identical picture signals may be synchronously output from picture output devices 3.

Display apparatus 1 includes display section 11, display drive section 12, picture signal input section 13, operation input section 14, communication section 15, and control section 16. Display apparatuses 1 shown in FIG. 1 have same configurations.

Display section 11 is a known display panel, such as a liquid crystal display, a plasma display, or a projection display, which displays a picture. Display drive section 12 is a panel drive circuit corresponding to display section 11 and causes display section 11 to display a picture in accordance with a picture signal supplied from control section 16.

Picture signal input section 13 is a known interface circuit which receives a picture signal output from picture distributor 2 or picture output device 3.

Operation input section 14 is composed of a circuit or an apparatus which accepts an instruction input from a user. Operation input section 14 includes, for example, a light-receiving section which receives a light (infrared) signal emitted from a remote controller and converts the light signal into an electrical signal, and receives an instruction from the user using the remote controller and outputs the instruction to control section 16. Operation input section 14 is not limited to a configuration which supports a remote controller and may be configured to, for example, accept an instruction input from a user using a button or the like provided in a main body of display apparatus 1.

Communication section 15 is a communication circuit for sending and receiving information. A known interface, such as Ethernet (registered trademark) or RS-232C (Recommended Standard 232C), may be used for sending and reception of information by communication section 15. Display apparatuses 1 are connected so as to be capable of sending and receiving information to and from each other via communication sections 15. Although FIG. 1 shows a configurational example in which display apparatuses 1 are connected in a wired manner, display apparatuses 1 may send and receive information to and from each other using known wireless means.

Control section 16 is a circuit which controls the operation of the entire display apparatus. When control section 16 receives picture signals from picture distributor 2 or picture output device 3 via picture signal input section 13, control section 16 divides a picture according to the number of display apparatuses 1 arrayed in a vertical direction and the number of display apparatuses 1 arrayed in a horizontal direction, retrieves a partial picture corresponding to a picture position set in display apparatus 1, to which control section 16 belongs, and causes display drive section 12 to display the retrieved partial picture on display section 11 on an enlarged scale. The term picture position refers to a piece of information indicating a position for a partial picture obtained through division to be displayed by each display apparatus 1.

When control section 16 is instructed by a user via operation input section 14 to change a picture position, control section 16 exchanges picture position information with display apparatus 1 displaying a partial picture corresponding to the picture position to be changed that is notified by the user and swaps the picture positions of the display apparatuses.

Control section 16 can be implemented by an information processing apparatus including a picture signal processing circuit including a processor which executes required processing (e.g., decoding, division, enlargement, contour correction, color correction, noise removal, and resolution conversion) on a picture signal and a frame memory, a CPU which executes processing in accordance with a control program, a main storage device which temporarily holds information necessary for processing by the CPU, a sub-storage device which stores a control program for causing the CPU to execute processing and various data, and the like. A display layout changing method according to the exemplary embodiment (to be described later) is implemented, for example, when the CPU of control section 16 of each display apparatus 1 executes processing in accordance with a control program.

Figure 2:
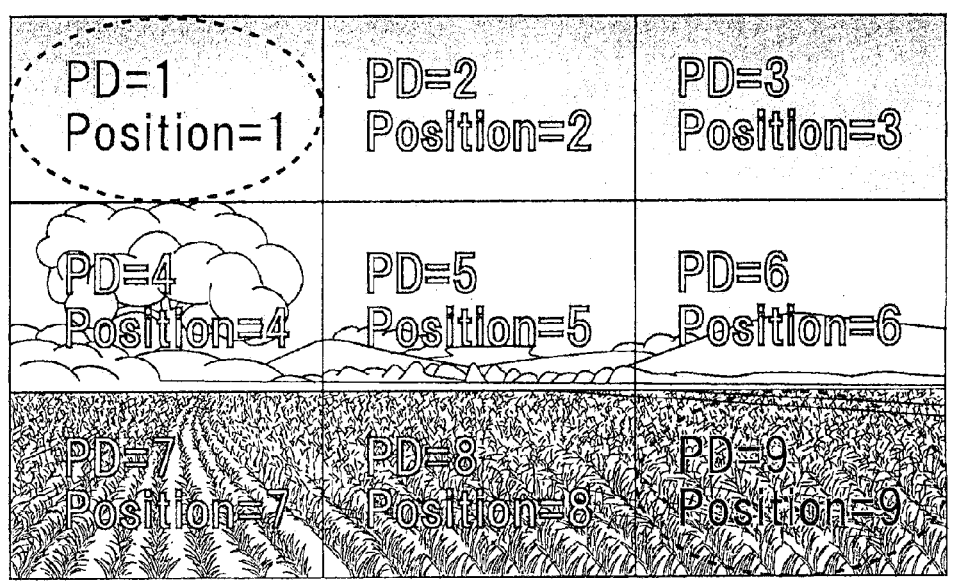
FIG. 2 is a schematic view showing one example of the display layout of the multi-display system shown in FIG. 1.
Figure 4:
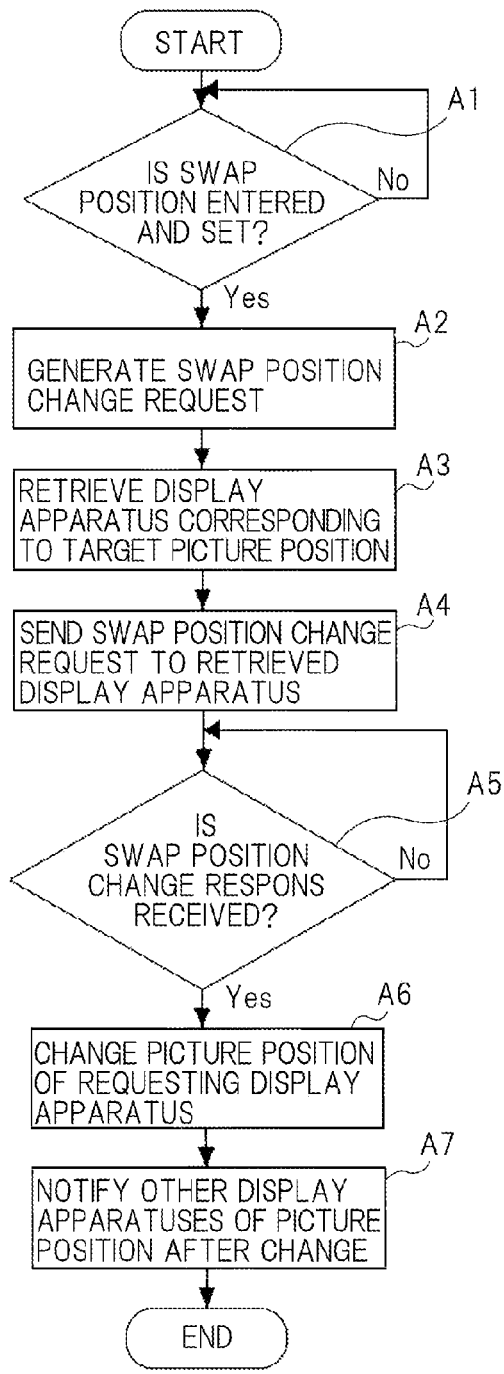
FIGS. 4(a) and 4(b) are flowcharts showing procedures according to a first exemplary embodiment of a display layout changing method according to the present invention.
Figure 4:
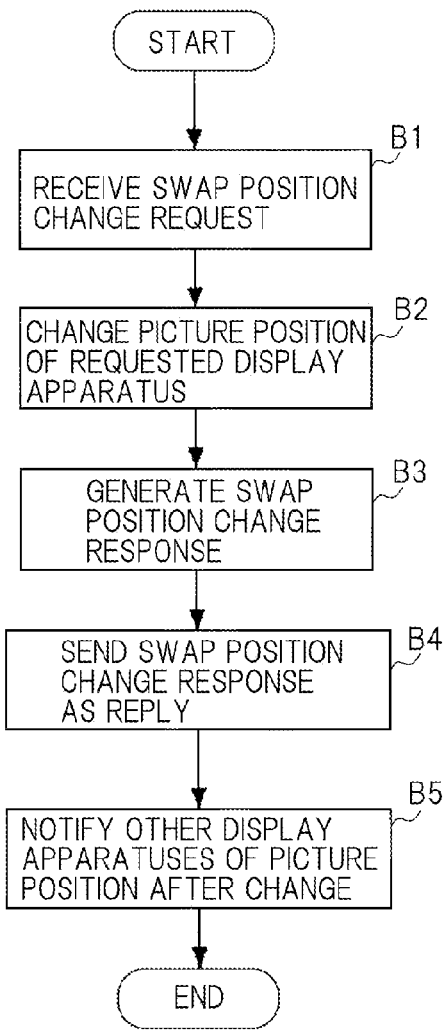
Figure 5:
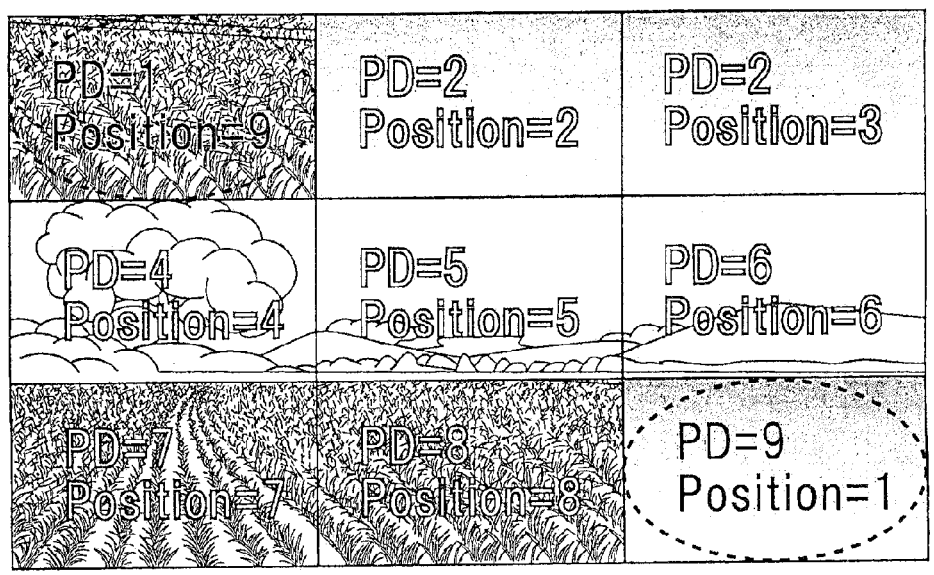
FIG. 5 is a schematic view showing one example of the display layout after processing by the display layout changing method according to the present invention.

FIG. 2 is a schematic view showing one example of the display layout of the multi-display system shown in FIG. 1. FIGS. 3(a), 3(b) and 3(c) are schematic views showing one example of an operation screen used to change the display layout shown in FIG. 2. FIGS. 4(a) and 4(b) are flowcharts showing procedures according to the first exemplary embodiment of a display layout changing method according to the present invention. FIG. 5 is a schematic view showing one example of the display layout after processing by the display layout changing method according to the present invention. Note that FIG. 4(a) shows a procedure for control section 16 of display apparatus 1 that is instructed by a user via operation input section 14 to change a picture position and that FIG. 4(b) shows a procedure for control section 16 of display apparatus 1 that changes a picture position in response to a request from instructed display apparatus 1.

The display layout changing method according to the exemplary embodiment will be described in the context of a multi-display system including a total of nine display apparatuses 1 with three display apparatuses 1 in the vertical direction by three display apparatuses 1 in the horizontal direction, as shown in FIGS. 2 and 5. The number of display apparatuses of a multi-display system may be any number as long as the number is not less than two.

In the multi-display system shown in FIGS. 2 and 5, three display apparatuses 1 in the top row are denoted by PD=1, PD=2, and PD=3, starting from the left, three display apparatuses 1 in the middle row are denoted by PD=4, PD=5, and PD=6, starting from the left, and three display apparatuses 1 in the bottom row are denoted by PD=7, PD=8, and PD=9, starting from the left.

Additionally, assume that initial values of picture positions (Position) are set in the manner below in display apparatuses 1. Picture positions are set to Position=1, Position=2, and Position=3 in three display apparatuses 1 in the top row, starting from the left, picture positions are set to Position=4, Position=5, and Position=6 in three display apparatuses 1 in the middle row, starting from the left, and picture positions are set to Position=7, Position=8, and Position=9 in three display apparatuses 1 in the bottom row, starting from the left.

Thus, in the multi-display system shown in FIG. 2, display apparatus PD=1 in the top row displays a partial picture corresponding to the picture position of Position=1 on an enlarged scale, display apparatus PD=2 displays a partial picture corresponding to the picture position of Position=2 on an enlarged scale, and display apparatus PD=3 displays a partial picture corresponding to the picture position of Position=3 on an enlarged scale, in an initial state. Display apparatuses PD=4 to PD=6 in the middle row and display apparatuses PD=7 to PD=9 in the bottom row similarly display partial pictures corresponding to the picture positions set in the display apparatuses on an enlarged scale.

Assume that control sections 16 of display apparatuses PD=1 to PD=9 each recognize the respective picture positions set in display apparatuses PD=1 to PD=9 by sending and receiving a control message including a piece of picture position information of the display apparatus, to which control section 16 belongs, to and from a different one of display apparatuses PD=1 to PD=9 via communication section 15, for example, at the time of picture position setting change or periodically. In this case, control section 16 of each of display apparatuses PD=1 to PD=9 may store respective pieces of identification information (e.g., MAC (Media Access Control) addresses) for display apparatuses PD=1 to PD=9 and respective pieces of picture position information in the sub-storage device or the like, for example, in table form. When each display apparatus 1 sends or receives information, the MAC address described above can also be used as an address for identifying display apparatus 1 as an information sending source or an information sending destination.

The display layout changing method according to the exemplary embodiment will be described below in the context of a case where partial pictures displayed by display apparatus PD=1 and display apparatus PD=9 are swapped. Two display apparatuses 1 that swap partial pictures are not limited to display apparatus PD=1 and display apparatus PD=9 and can be freely selected.

When a user activates an OSD function of display apparatus PD=1 using, for example, the remote controller and selects a SWAP menu for giving an instruction for partial picture swapping from a predetermined main menu, control section 16 of display apparatus PD=1 causes display section 11 to display an image of the SWAP menu.

As shown in FIG. 3(a), the SWAP menu has, for example, an area for displaying the number of display apparatuses in the horizontal direction (H MONITORS), the number of display apparatuses in the vertical direction (V MONITORS), and the picture position set in display apparatus PD=1 (POSITION), and an area for entering a target picture position (SWAP POSITION) which can be set by the user and is a picture position of the partial pictures.

As shown in FIG. 4(a), control section 16 of display apparatus PD=1 judges whether the target picture position (SWAP POSITION) in the SWAP menu is entered and set while the SWAP menu is displayed (step A1). If the target picture position (SWAP POSITION) is not entered and set, the flow returns to the process in step A1.

If the user enters '9' in the area for the target picture position (SWAP POSITION) and confirms the entry using the remote controller or the like (FIG. 3(b)), control section 16 of display apparatus PD=1 generates a control message (SWAP POSITION change request) which includes the picture position (Position=1) set in display apparatus PD=1 as a piece of information and requests picture position change (step A2).

Control section 16 of display apparatus PD=1 then refers to a table or the like representing the relationships between display apparatuses 1 and their picture positions and retrieves display apparatus PD=9 displaying a partial picture corresponding to the picture position of '9' (Position=9) that is specified as a target by the user (step A3).

Control section 16 of display apparatus PD=1 then sends the SWAP POSITION change request generated in step A2 to display apparatus PD=9 retrieved in step A3 via communication section 15 (step A4).

As shown in FIG. 4(b), when control section 16 of display apparatus PD=9 receives the SWAP POSITION change request from display apparatus PD=1 via communication section 15 (step B1), control section 16 changes the picture position of display apparatus PD=9 on the basis of the piece of picture position information included in the SWAP POSITION change request (step B2). More specifically, control section 16 changes the picture position of display apparatus PD=9 from Position=9 to Position=1. Control section 16 of display apparatus PD=9 generates a control message (SWAP POSITION change response) which includes a picture position (Position=9) before the change as a piece of information and indicates completion of picture position change (step B3) and sends the SWAP POSITION change response to display apparatus PD=1 via communication section 15 (step B4). Control section 16 of display apparatus PD=9 notifies all other display apparatuses 1 of a picture position after the change via communication section 15 (step B5).

As shown in FIG. 4(a), after control section 16 of display apparatus PD=1 sends the SWAP POSITION change request in step A4, control section 16 waits for the SWAP POSITION change response from display apparatus PD=9. Control section 16 of display apparatus PD=1 judges whether control section 16 has received the SWAP POSITION change response from display apparatus PD=9 (step A5). If control section 16 has not received the SWAP POSITION change response, control section 16 repeats the process in step A5.

When control section 16 receives the SWAP POSITION change response from display apparatus PD=9, control section 16 changes the picture position set in display apparatus PD=1 from Position=1 to Position=9 that is notified by the user and updates a value of the picture position (POSITION) displayed in the SWAP menu to '9,' as shown in FIG. 3(c) (step A6). Control section 16 of display apparatus PD=1 notifies all other display apparatuses 1 of the picture position after the change via communication section 15 (step A7).

Next, for example, when the user deactivates the OSD function, the partial picture corresponding to the picture position (Position=9) after the change is displayed on an enlarged scale on display apparatus PD=1, and the partial picture corresponding to the picture position (Position=1) after the change is displayed on an enlarged scale on display apparatus PD=9, as shown in FIG. 5.

According to the exemplary embodiment, if partial pictures displayed by two display apparatuses 1 are desired to be swapped in the multi-display system including a plurality of display apparatuses 1, the partial pictures displayed by two desired display apparatuses 1 can be swapped only by changing the picture position for either of display apparatuses 1. For this reason, the display layout of the multi-display system can be easily changed.

The display layout is not automatically changed on the basis of detecting the number of pictures input, the resolution of a displayed picture, the positions of people around the system, and the like in the exemplary embodiment, and each display apparatus need not include a high-throughput CPU or the like. Additionally, since a picture position is changed using an existing OSD function of each display apparatus 1, change of the display layout can be implemented only by changing a control program to be executed by control section 16. This prevents the cost of the multi-display system from rising.

Thus, a multi-display system capable of easily changing a display layout without causing a rise in cost is obtained.

Second Exemplary Embodiment

A second exemplary embodiment of a multi-display system according to the present invention will be described with reference to the drawings.

The first exemplary embodiment has illustrated an example in which each display apparatus 1 stores picture positions set for respective display apparatuses, and display apparatus 1 instructed by a user to change a picture position requests target display apparatus 1 to change a picture position to thereby swapping partial pictures.

The multi-display system according to the second exemplary embodiment is an example which allows swapping of partial pictures even if each display apparatus 1 does not know the picture positions set for respective display apparatuses. The configurations of the multi-display system and each display apparatus are the same as those in the first exemplary embodiment, and a description thereof will be omitted.

Figure 6:
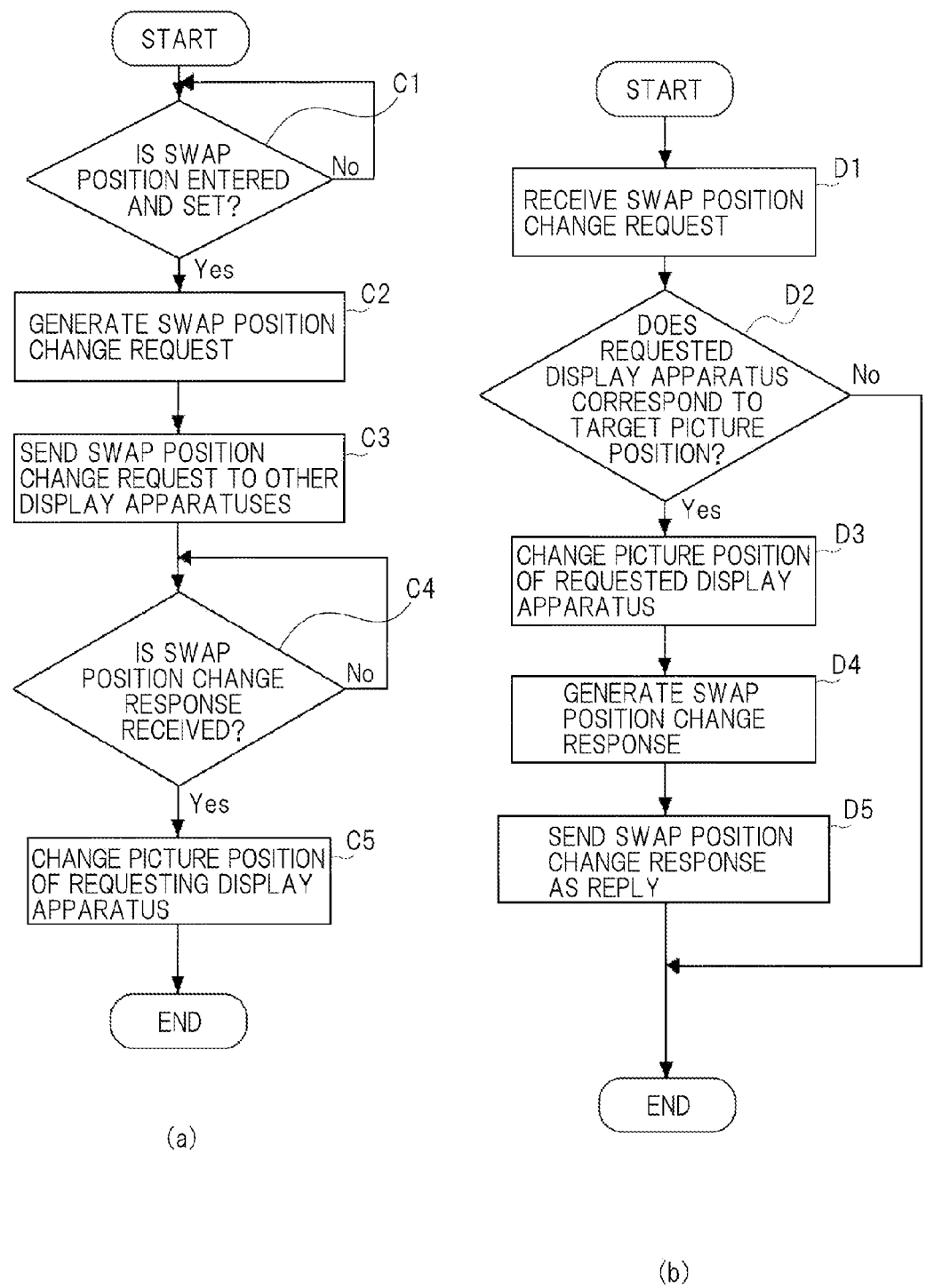
FIGS. 6(a) and 6(b) are flowcharts showing procedures according to a second exemplary embodiment of a display layout changing method according to the present invention.

FIGS. 6(a) and 6(b) are flowcharts showing procedures according to a second exemplary embodiment of a display layout changing method according to the present invention. Note that FIG. 6(a) shows a procedure for control section 16 of display apparatus 1 instructed by a user via operation input section 14 to change a picture position and that FIG. 6(b) shows a procedure for control section 16 of display apparatus 1 that changes a picture position in response to a request from instructed display apparatus 1.

The display layout changing method according to the exemplary embodiment will be described below in the context of a case where partial pictures displayed by display apparatus PD=1 and display apparatus PD=9 are swapped in a multi-display system including a total of nine display apparatuses 1 with three display apparatuses 1 in a vertical direction by three display apparatuses 1 in a horizontal direction, like the first exemplary embodiment.

When a user activates an OSD function of display apparatus PD=1 using, for example, a remote controller and selects a SWAP menu for giving an instruction for partial picture swapping from a predetermined main menu, control section 16 of display apparatus PD=1 causes display section 11 to display an image of the SWAP menu.

As shown in FIG. 6(a), control section 16 of display apparatus PD=1 judges whether a target picture position (SWAP POSITION) in the SWAP menu is entered and set while the SWAP menu is displayed (step C1). If the target picture position (SWAP POSITION) is not entered and set, the flow returns to the process in step C1.

If the user enters '9' in an area for the target picture position (SWAP POSITION) and confirms the entry using the remote controller or the like (FIG. 3(b)), control section 16 of display apparatus PD=1 generates a control message (SWAP POSITION change request) which includes a piece of identification information (e.g., the MAC address described above) of display apparatus PD=1 and pieces of information on a picture position (Position=1) set in display apparatus PD=1 and a target picture position (Position=9) and requests picture position change (step C2).

Control section 16 of display apparatus PD=1 then sends (broadcasts) the SWAP POSITION change request generated in step C2 to all other display apparatuses 1 via communication section 15 (step C3).

As shown in FIG. 6(b), when control section 16 of every display apparatus 1 except for display apparatus PD=1 receives the SWAP POSITION change request (step D1), control section 16 judges whether a picture position set in display apparatus 1, to which control section 16 belongs, corresponds to the target picture position included in the SWAP POSITION change request (step D2).

If the picture position set in display apparatus 1, to which control section 16 belongs, does not correspond to the target picture position included in the received SWAP POSITION change request, control section 16 of every display apparatus 1 except for display apparatus PD=1 ends the process.

On the other hand, if the picture position set in display apparatus 1, to which control section 16 belongs, corresponds to the target picture position (in the case of display apparatus PD=9), control section 16 of display apparatus PD=9 changes the picture position of display apparatus PD=9 on the basis of the piece of picture position information included in the SWAP POSITION change request (step D3). More specifically, control section 16 changes the picture position of display apparatus PD=9 from Position=9 to Position=1. Control section 16 of display apparatus PD=9 generates a control message (SWAP POSITION change response) which includes a picture position (Position=9) before the change as a piece of information and indicates completion of picture position change (step D4) and sends the SWAP POSITION change response as a reply to display apparatus PD=1 that is the source of the SWAP POSITION change request via communication section 15 (step D5).

As shown in FIG. 6(a), after control section 16 of display apparatus PD=1 sends the SWAP POSITION change request in step C3, control section 16 waits for the SWAP POSITION change response. Control section 16 of display apparatus PD=1 judges whether control section 16 has received the SWAP POSITION change response (step C4). If control section 16 has not received the SWAP POSITION change response, control section 16 repeats the process in step C4.

When control section 16 of display apparatus PD=1 receives the SWAP POSITION change response from display apparatus PD=9, control section 16 changes the picture position set in display apparatus PD=1 from Position=1 to Position=9 that is notified by the user and updates a value of a picture position (POSITION) displayed in the SWAP menu to '9,' as shown in FIG. 3(c) (step C5).

Next, a partial picture corresponding to a picture position (Position=9) after the change is displayed on an enlarged scale on display apparatus PD=1, and a partial picture corresponding to a picture position (Position=1) after the change is displayed on an enlarged scale on display apparatus PD=9, like the first exemplary embodiment (see FIG. 5).

In the multi-display system according to the exemplary embodiment, control section 16 of each display apparatus 1 does not need to send nor to receive a control message including a piece of picture position information of display apparatus 1, to which control section 16 belongs, to and from a different one of display apparatuses 1 via communication section 15 nor to store picture positions set for respective display apparatuses. For this reason, the multi-display system not only implements a reduction in the processing load on control section 16 and a reduction in the capacity of a storage device of control section 16 but also achieves the same effect as that of the first exemplary embodiment.

Although the invention of the present application has been described above with reference to the exemplary embodiments, the invention of the present application is not limited to the exemplary embodiments. Various changes understandable to those skilled in the art may be made to the configuration and details of the invention of the present application within the scope of the invention of the present application.

The invention claimed is:

1. A multi-display system comprising:
a plurality of display apparatuses that divide one picture represented by a picture signal output from a picture output device into a plurality of partial pictures and display the respective partial pictures,
wherein a display apparatus of the plurality of display apparatuses comprises:
a display section that displays a picture,
an operation input section that accepts an instruction input,
a communication section that sends and receives information between the plurality of display apparatuses, and
a control section that controls operation of said display section and said communication section in response to an input to said operation input section, and
wherein said control section:
sends picture position information including a first picture position corresponding to a currently displayed partial picture to at least the display apparatus displaying the partial picture corresponding to a second picture position via said communication section when the control section is instructed to change the picture position and is notified about the second picture position via said operation input section,
causes the display section to display the partial picture corresponding to the second picture position,
sends a request for change of a partial picture to be displayed to one of the display apparatuses together with the second picture position and the first picture position and then causes the display section to display the partial picture corresponding to the second picture position when the control section is instructed to change the picture position and is notified about the second picture position via said operation input section,
judges whether a third picture position sent together with a request for change of the picture position corresponds to the first picture position, when the control section receives the request for change from a different one of the display apparatuses via said communication section, and
displays the partial picture corresponding to a fourth picture position set in the different one of the display apparatuses if the third picture position corresponds to the first picture position.

2. The multi-display system according to claim 1, wherein said control section:
stores pieces of picture position information corresponding to the partial pictures displayed by the display apparatuses upon notification from a different one of the display apparatuses,
sends a request for change of a partial picture to be displayed together with the first picture position to the display apparatus displaying the partial picture corresponding to the second picture position, and then causes the display section to display the partial picture corresponding to the second picture position and notifies one of the display apparatuses of the second picture position when the control section is instructed to change the picture position and is notified about the second picture position via said operation input section, and
displays the partial picture corresponding to a third picture position sent together with a request for change of the picture position and notifies one of the display apparatuses of the third picture position when the control section receives the request for change from a different one of the display apparatuses via said communication section.

3. The multi-display system according to claim 1, wherein said control section:
causes said display section using an on-screen display function to display a menu image for entering an instruction to change the picture position.

4. A display layout changing method comprising:
in a multi-display system including a plurality of display apparatuses that divide one picture represented by a picture signal output from a picture output device into a plurality of partial pictures and display the respective partial pictures:
sending picture position information including a first picture position corresponding to a currently displayed partial picture to at least the display apparatus displaying the partial picture corresponding to a second picture position via a communication section of the display apparatus when the display apparatus is instructed to change the picture position and is notified about the second picture position via an operation input section of the display apparatus; and
displaying, by the display apparatus, the partial picture corresponding to the second picture position, wherein said display apparatus:
sends a request for change of a partial picture to be displayed to one of the display apparatuses together with the second picture position and the first picture position and then causes the display section to display the partial picture corresponding to the second picture position when the display apparatus is instructed to change the picture position and is notified about the second picture position via the operation input section,
judges whether a third picture position sent together with a request for change of the picture position corresponds to the first picture position when the display apparatus receives the request for change from a different one of the display apparatuses via a communication section, and
displays the partial picture corresponding to a fourth picture position set in the different one of the display apparatuses if the third picture position corresponds to the first picture position.

5. The display layout changing method according to claim 4, wherein said display apparatus:
stores pieces of picture position information corresponding to the partial pictures displayed by the display apparatuses in a storage device upon notification from a different one of the display apparatuses via a communication section,
sends a request for change of a partial picture to be displayed together with the first picture position to the display apparatus displaying the partial picture corresponding to the second picture position, and then causes the display section to display the partial picture corresponding to the second picture position and notifies one of the display apparatuses of the second picture position when the display apparatus is instructed to change the picture position and is notified about the second picture position via the operation input section, and
displays the partial picture corresponding to a third picture position sent together with a request for change of the picture position and notifies one of the display apparatuses of the third picture position when the display apparatus receives the request for change from a different one of the display apparatuses via the communication section.

6. The display layout changing method according to claim 4, wherein said display apparatus:
displays a menu image for inputting an instruction to change the picture position using an on-screen display function.

7. A display apparatus comprising:
a display section that displays one of a plurality of partial pictures into which one picture represented by a picture signal is divided for different picture positions;
an operation input section that accepts an instruction input;
a communication section that sends and receives information; and
a control section that controls operation of said display section and said communication section in response to an input to said operation input section,
wherein said control section:
causes said display section to display a partial picture of the plurality of partial pictures corresponding to a first picture position that is set in the display apparatus,
sends a piece of information on the first picture position via said communication section and causes said display section to display the partial picture corresponding to a second picture position when the control section is instructed to change the picture position and is notified about the second picture position via said operation input section,
sends a request for change of a partial picture to be displayed on one display apparatus of a plurality of display apparatuses together with the second picture position and the first picture position and then causes the display section to display the partial picture corresponding to the second picture position when the control section is instructed to change the picture position and is notified about the second picture position via said operation input section,
judges whether a third picture position sent together with a request for change of the picture position corresponds to the first picture position, when the control section receives the request for change from a different display apparatus of the plurality of display apparatuses via said communication section, and
displays the partial picture corresponding to a fourth picture position set in the different display apparatus if the third picture position corresponds to the first picture position.

8. The multi-display system according to claim 1, wherein said control section:
stores pieces of picture position information corresponding to the partial pictures displayed by the display apparatuses;
sends a request for change of a partial picture to be displayed together with the first picture position to the display apparatus displaying the partial picture corresponding to the second picture position, and then causes the display section to display the partial picture corresponding to the second picture position when the control section is instructed to change the picture position and is notified about the second picture position via said operation input section; and
displays the partial picture corresponding to the third picture position sent together with a request for change of the picture position when the control section receives the request for change from a different one of the display apparatuses via said communication section.

9. The multi-display system according to claim 1, further comprising:
a picture signal input section comprising an interface circuit that receives the picture signal output from the picture output device.

10. The multi-display system according to claim 1, further comprising:
a display drive section comprising a panel drive circuit that causes the display section to display the picture in accordance with a picture signal supplied from the control section.

11. The multi-display system according to claim 10, wherein the control section stores pieces of picture position information corresponding to the partial pictures displayed by the display apparatuses.

* * * * *